United States Patent
Edwards et al.

(10) Patent No.: US 11,614,933 B2
(45) Date of Patent: *Mar. 28, 2023

(54) DISABLING A SCRIPT BASED ON INDICATIONS OF UNSUCCESSFUL EXECUTION OF THE SCRIPT

(71) Applicant: Capital One Services, LLC, McLean, VA (US)

(72) Inventors: Joshua Edwards, McLean, VA (US); Vu Nguyen, McLean, VA (US); Adam Vukich, McLean, VA (US); Mykhaylo Bulgakov, McLean, VA (US); Abdelkadar M'Hamed Benkreira, McLean, VA (US); David Gabriele, McLean, VA (US); Andrea Montealegre, McLean, VA (US); George Bergeron, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/453,682

(22) Filed: Nov. 5, 2021

(65) Prior Publication Data

US 2022/0058016 A1    Feb. 24, 2022

Related U.S. Application Data

(63) Continuation of application No. 16/585,230, filed on Sep. 27, 2019, now Pat. No. 11,182,153, which is a
(Continued)

(51) Int. Cl.
*G06F 8/60* (2018.01)
*G06F 8/71* (2018.01)
(Continued)

(52) U.S. Cl.
CPC ............... *G06F 8/71* (2013.01); *H04L 67/34* (2013.01); *G06F 8/60* (2013.01); *G06F 8/61* (2013.01);
(Continued)

(58) Field of Classification Search
CPC ..... G06F 8/60; G06F 8/61; G06F 8/65; G06F 8/70; G06F 8/71; H04L 67/34; H04L 67/42
See application file for complete search history.

(56) References Cited

U.S. PATENT DOCUMENTS 10,459,719 B1  10/2019  Edwards et al.
11,182,153 B2  11/2021  Edwards et al.
(Continued)

OTHER PUBLICATIONS

Y. Zhou and D. Evans, "Understanding and Monitoring Embedded Web Scripts," 2015 IEEE Symposium on Security and Privacy, 2015, pp. 850-865, doi: 10.1109/SP.2015.57. (Year: 2015).*
(Continued)

*Primary Examiner* — Hanh Thi-Minh Bui
(74) *Attorney, Agent, or Firm* — Harrity & Harrity, LLP

(57) ABSTRACT

In some implementations, a server device may receive, from a client device, a script identifier, that identifies a script, and an indication of whether the script was successfully executed by the client device. The server device may determine whether a condition associated with disabling the script is satisfied based on the script identifier, the indication of whether the script was successfully executed by the client device, and stored information determined based on a plurality of indications of whether the script was successfully executed by a plurality of other client devices. The server device may selectively cause a data structure to be updated to indicate that the script is disabled based on determining whether the condition is satisfied. The data structure may be
(Continued)

used to indicate whether the script is enabled prior to execution of the script.

21 Claims, 9 Drawing Sheets

Related U.S. Application Data continuation of application No. 16/280,680, filed on Feb. 20, 2019, now Pat. No. 10,459,719.

(51) Int. Cl.
  *H04L 67/00* (2022.01)
  *G06F 8/61* (2018.01)
  *G06F 8/65* (2018.01)
  *G06F 8/70* (2018.01)
  *H04L 67/01* (2022.01)

(52) U.S. Cl.
  CPC .............. *G06F 8/65* (2013.01); *G06F 8/70* (2013.01); *H04L 67/01* (2022.05)

(56) References Cited

U.S. PATENT DOCUMENTS

| | | | |
|---|---|---|---|
| 2005/0125461 | A1 | 6/2005 | Filz |
| 2015/0331779 | A1* | 11/2015 | Subramaniam ..... G06F 11/3688 717/124 |
| 2016/0004628 | A1 | 1/2016 | Gugri |
| 2017/0052776 | A1* | 2/2017 | Kotian ................... G06F 21/12 |
| 2017/0132000 | A1 | 5/2017 | Voigt et al. |
| 2019/0278694 | A1 | 9/2019 | Tucker et al. |
| 2019/0340109 | A1 | 11/2019 | Barron-Kraus et al. |

OTHER PUBLICATIONS

Doupe A., et al., "deDacota: Toward Preventing Server-Side XSS via Automatic Code and Data Separation," ACM, 2013, pp. 1205-1216, [Retrieved online on Aug. 8, 2019], Retrieved from the Internet [URL:[http://delivery.acm.org/10.1145/2520000/2516708/p1205-doupe.pdf?].

Hosek, et al., "Safe Software Updates via Multi-version Execution," 2013 35th International Conference on Software Engineering (ICSE), San Francisco, CA, USA, 2013, pp. 612-621. [retrieved on Jul. 26, 2021] Retrieved from the Internet:[https://ieeexplore.ieee.org/stamp/stamp.jsp?tp=&arnumber=6606607].

\* cited by examiner

DISABLING A SCRIPT BASED ON INDICATIONS OF UNSUCCESSFUL EXECUTION OF THE SCRIPT

RELATED APPLICATIONS

This application is a continuation of U.S. patent application Ser. No. 16/585,230, filed Sep. 27, 2019 (now U.S. Pat. No. 11,182,153), which is a continuation of U.S. patent application Ser. No. 16/280,680, filed Feb. 20, 2019 (now U.S. Pat. No. 10,459,719), which are incorporated herein by reference in their entireties.

BACKGROUND

A browser extension or an application may execute a script (e.g., code, which may be written in a scripting language, such as JavaScript and/or the like) to perform an operation in association with a web browser or the application. A script manager may be used to create, download, install, organize, delete, and/or edit scripts, as well as modify script permissions.

SUMMARY

In some implementations, a method may include receiving, by a device, a report associated with execution of a script by a client device. The report may include a script identifier that identifies the script, and may include an indication of whether the script was successfully executed by the client device. The method may include determining, by the device, that a condition associated with execution of the script is satisfied based on the script identifier, the indication of whether the script was successfully executed by the client device, and one or more indications, received from one or more other client devices, of whether the script was successfully executed by the one or more other client devices. The method may include causing, by the device, a data structure to be updated to indicate that the script is disabled based on determining that the condition is satisfied. The data structure may be used to indicate, to client devices, whether the script is enabled prior to execution of the script by the client devices.

In some implementations, a server device may include memory and one or more processors communicatively coupled to the memory. The one or more processors may be configured to receive, from a client device, a script identifier, that identifies a script, and an indication of whether the script was successfully executed by the client device The one or more processors may be configured to determine whether a condition associated with disabling the script is satisfied based on the script identifier, the indication of whether the script was successfully executed by the client device, and stored information determined based on a plurality of indications of whether the script was successfully executed by a plurality of other client devices. The one or more processors may be configured to selectively cause a data structure to be updated to indicate that the script is disabled based on determining whether the condition is satisfied. The data structure may be used to indicate whether the script is enabled prior to execution of the script.

In some implementations, a non-transitory computer-readable medium may store one or more instructions that, when executed by one or more processors of a client device, cause the one or more processors to identify a script to be validated for execution by the client device and transmit, to a server, a validation request associated with the script. The validation request may include a script identifier. The one or more instructions may cause the one or more processors to receive, from the server, an indication that the script is enabled based on transmitting the validation request. The one or more instructions may cause the one or more processors to execute the script based on receiving the indication that the script is enabled and determine whether the script was successfully executed. The one or more instructions may cause the one or more processors to transmit, to the server or another server, the script identifier and an indication of whether the script was successfully executed by the client device.

DETAILED DESCRIPTION

Figure 1A:
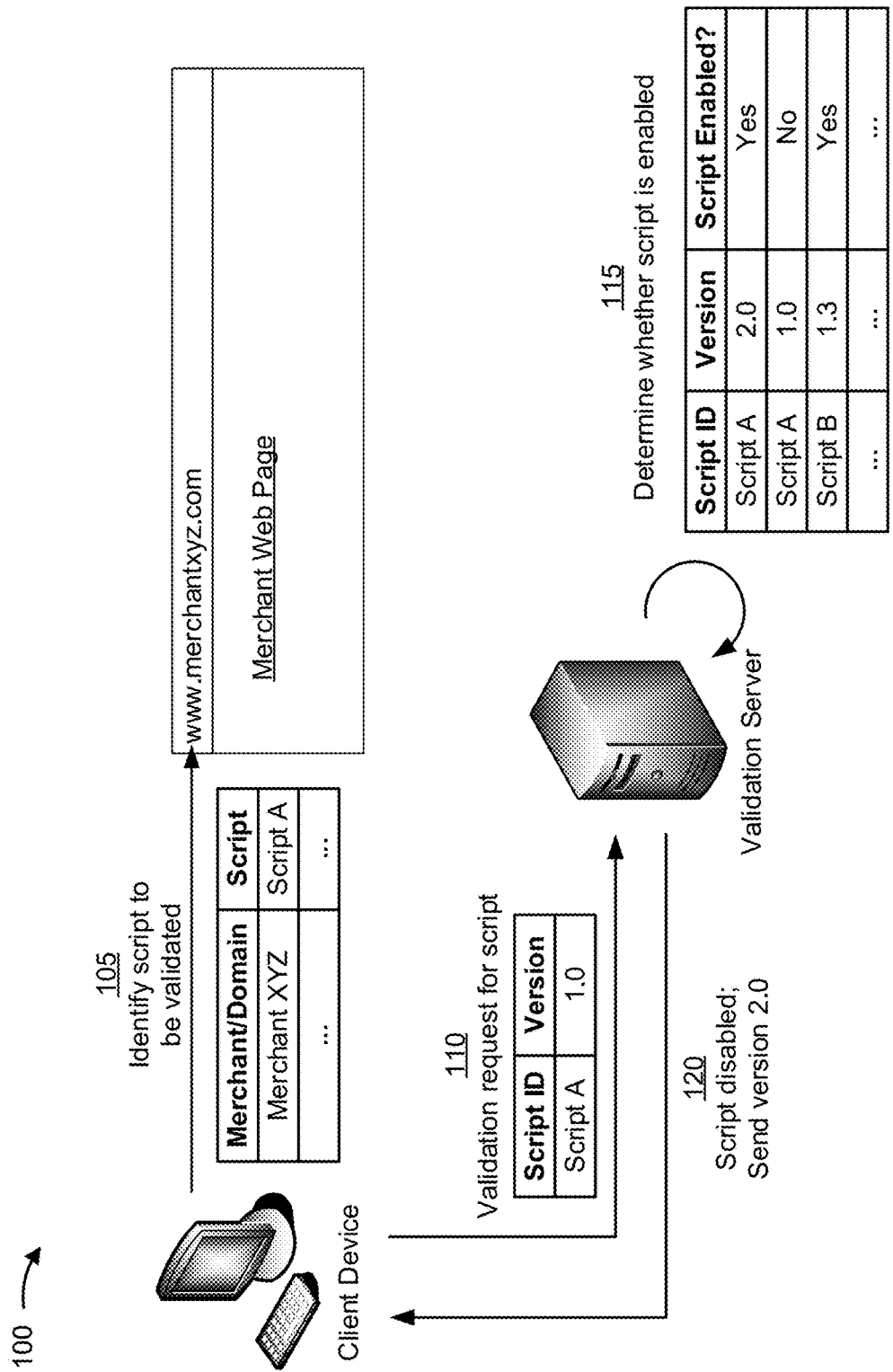
FIGS. 1A-1D are diagrams of an example implementation described herein.

The following detailed description of example implementations refers to the accompanying drawings. The same reference numbers in different drawings may identify the same or similar elements.

A script may be executed by an application, such as a browser extension or a plug-in application, to enhance functionality of a web browser or another application. The script may include code, which may be written in a scripting language, such as JavaScript and/or the like. Execution of the script may cause an operation to be performed in association with the web browser or application. Some scripts may be executed based on user input (e.g., clicking a button or otherwise interacting with a user input component), and some scripts may be automatically executed (e.g., based on a determination that one or more conditions are satisfied).

In some cases, a script may be executed by a server (e.g., sometimes referred to as server-side scripting), and a client device may communicate with the server to initiate execution of the script and/or to receive output generated by the server after execution of the script. However, when the script interacts with sensitive content that requires an authentication user session (e.g., that requires a user to log in) before the content can be accessed or rendered, successful execution of the script may require that user credentials be stored by and/or accessible to the server. This may consume server resources (e.g., memory resources to store the user credentials, processing resources to write information to memory and/or read information from memory, resources to request the user credentials, and/or the like) and/or network resources (e.g., to request and/or receive the user credentials). Furthermore, this may create accessibility issues and/or lead to authentication failure when additional credentials and/or factors, other than the user credentials, are required for access, such as an answer to a security question, a code used with multi-factor authentication, and/or the like. This may also lead to authentication failure when the user credentials change, and such a change is not communicated to the server. Finally, this may create security vulnerabilities by increasing the likelihood of the user credentials becoming exposed due to storage of the user credentials on the server.

Some techniques and apparatuses described herein execute a script on a client device on which an application (e.g., an application on which the script operates) is executing. This is sometimes referred to as client-side scripting. By using client-side scripting, server resources may be conserved, network resources may be conserved, accessibility issues may be reduced, authentication failures may be reduced, and/or security vulnerabilities may be reduced.

However, client-side scripting may be more prone to errors than server-side scripting because the script may execute in a variety of different client device environments (e.g., different operating systems, different web browsers, different types of client devices, different applications executing on the client device, and/or the like). Furthermore, different client devices may have different versions of the script installed and may execute different versions of the script, whereas server-side scripting may always execute a most updated version of the script, thereby making client-side scripting more error prone than server-side scripting. Some techniques and apparatuses described herein assist with reducing errors in client-side script execution, such as by disabling a script based on indications of unsuccessful script execution. Additional details are described below.

FIGS. 1A-1D are diagrams of an example implementation 100 described herein.

As shown in FIG. 1A, a client device (e.g., a computer, a mobile phone, a tablet, and/or the like) may execute an application and an extension (e.g., a plug-in) for the application, such as a web browser application and a browser extension for the web browser application. As shown by reference number 105, the client device may identify a script to be validated. The script may be a client-side script that is to be executed by the client device. In some implementations, the client device may identify the script based on detecting navigation to (and/or loading of, access to, and/or the like) a web page associated with the script. For example, the client device may store a list of domains associated with execution of one or more scripts. Upon detecting navigation to a web page, the client device may determine a domain of the web page, and may determine whether the domain is included in the list of domains. If the domain is included in the list of domains, then the client device may identify a script to be validated for the domain (e.g., which may also be stored in the list or a data structure that includes the list and indicates relationships between scripts and domains). In some implementations, the client device may receive or modify the list based on information received from a server (e.g., a validation server, as shown).

In example 100, the client device detects navigation to a web page with a uniform resource locator (URL) of "www.merchantxyz.com." This web page has a domain of "merchantxyz." As further shown, the client device determines that a script identified as "Script A" is associated with the domain of "merchantxyz" (and/or is associated with a merchant associated with the domain).

As shown by reference number 110, the client device may transmit, to a validation server, a validation request for the script. The validation request may include information associated with the script, such as a script identifier (e.g., shown as "Script A"). Additionally, or alternatively, the information associated with the script may include a script version (e.g., shown as "1.0"). The script version may be indicated by the script identifier (e.g., each script version may have a unique script identifier), or may be indicated separately from the script identifier (e.g., the same script identifier may be associated with multiple script versions). Additionally, or alternatively, the information associated with the script may include a domain associated with the script, a merchant associated with the script, a customer segment associated with the script, a geographic region associated with the script (e.g., a geographic region in which the client device is located), a device type associated with the script (e.g., a device type of the client device), and/or the like.

As shown by reference number 115, the validation server may determine whether the script is enabled. For example, the validation server may use the information received from the client device and information stored in a data structure to determine whether the script is enabled. The data structure may be used to indicate, to client devices, whether a script is enabled prior to execution of the script by the client devices. For example, the data structure may store status indicators for scripts and/or versions of scripts. A status indicator for a script (and/or a version of a script) may indicate whether the script (and/or the version of the script) is enabled or disabled.

As shown, the data structure stores information indicating that version 2.0 of Script A is enabled, version 1.0 of Script A is disabled, version 1.3 of Script B is enabled, and so on. The validation server may use the information received from the client device (e.g., identifying Script A and version 1.0) to look up a status indicator for the script in the data structure. Because the stored status indicator for version 1.0 of Script A indicates that version 1.0 of Script A is disabled, the validation server determines that version 1.0 of Script A is disabled.

As shown by reference number 120, the validation server may transmit, and the client device may receive, an indication of whether the script is enabled. In example 100, the validation server transmits an indication that the script is disabled. In some implementations, and as shown, when the script is disabled, the validation server may transmit, to the client device, an updated version of the script (e.g., a most recent or most updated version), shown as version 2.0 of Script A. Alternatively, the validation server may indicate a location (e.g., a URL) from which the updated version of the script can be obtained. In some implementations, the validation server may transmit the updated version of the script and/or the indication of the location only if the updated version is enabled (e.g., based on a determination, using the data structure, of whether the updated version of the script is enabled). Otherwise, the validation server may transmit an indication that the script is disabled without transmitting an updated version of the script. In this case, the client device may refrain from executing the script, may refrain from presenting a request for user input regarding whether to execute the script, and/or the like. In this way, execution of an error-prone script may be avoided.

Although a single script is described in connection with example 100 as being identified for validation, in some implementations, the client device may identify multiple scripts to be validated. In this case, the client device may transmit information associated with the multiple scripts to the validation server, in a similar manner as described above. The validation server may determine whether each of the multiple scripts is enabled, in a similar manner as described above. The validation server may transmit, to the client device, an indication of whether each script is enabled or disabled. For example, the validation server may indicate a first set of scripts, of the multiple scripts, that are enabled (e.g., a set of enabled scripts) and/or may indicate a second set of scripts, of the multiple scripts, that are disabled (e.g., a set of disabled scripts). The client device may handle an enabled script and/or a disabled script in a similar manner as described elsewhere herein. In some implementations, the client device may present, for display, information that identifies a set of enabled scripts, and may present a request for user input indicating one or more scripts, of the set of enabled scripts, to be executed. The client device may execute the one or more scripts (e.g., all of the set of enabled scripts or a subset of the set of enabled scripts) based on the user input.

Figure 1B:
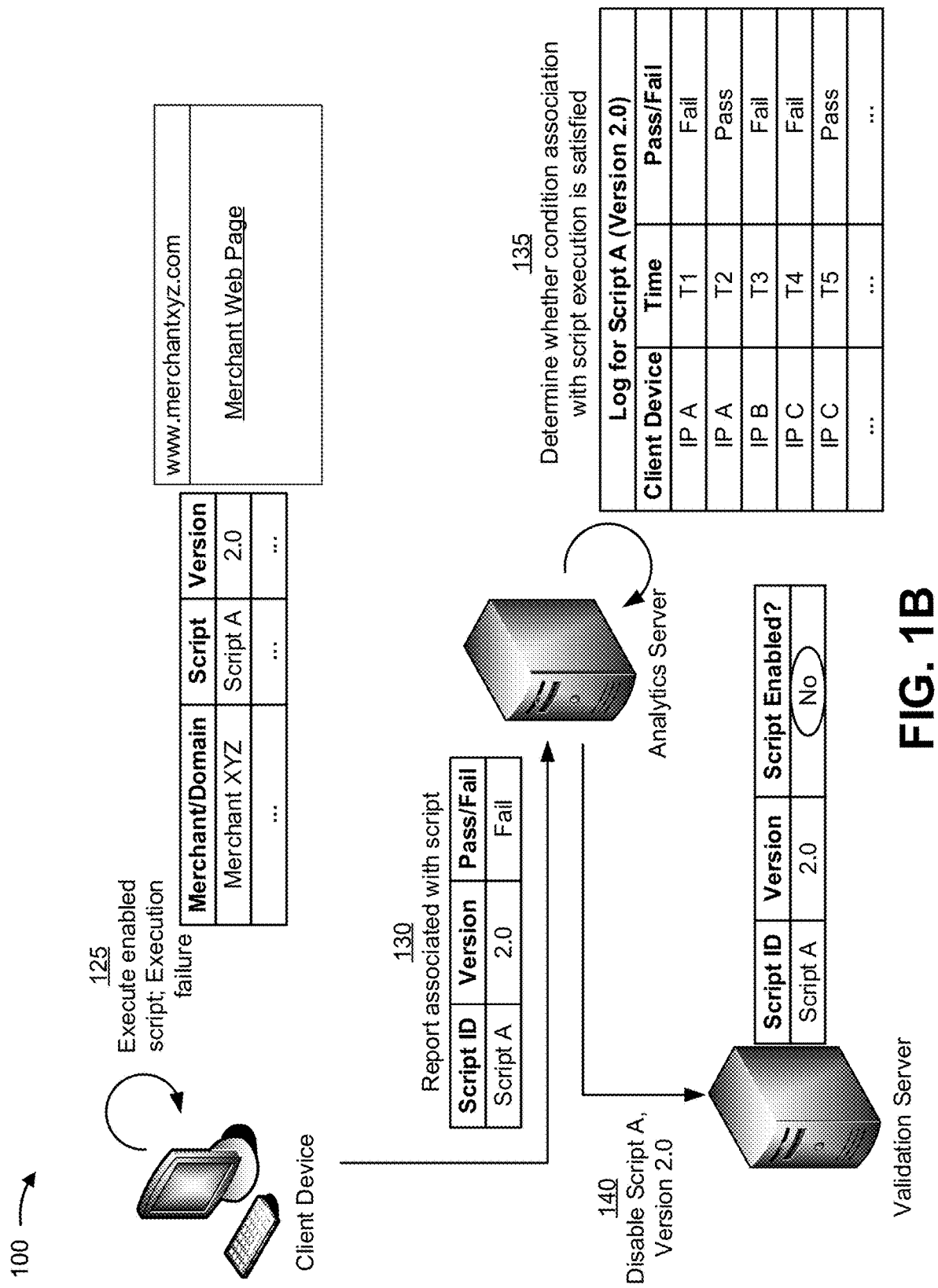

As shown in FIG. 1B, and by reference number 125, the client device may execute the script based on receiving an indication that the script is enabled. In example 100, the client device may replace version 1.0 of Script A with version 2.0 of Script A based on the information received from the validation server, as described above. The client device may then execute version 2.0 of Script A based on receiving the indication that version 2.0 of Script A is enabled. The client device may determine whether the script was successfully executed. As shown, in example 100, the client device determines that the script (e.g., version 2.0 of Script A) failed to execute.

In some implementations, the client device may determine whether the script was successfully executed based on a result of execution of the script. The result may include, for example, content generated as a result of execution of the script, content rendered by a web browser as a result of execution of the script, a message generated as a result of execution of the script (e.g., a validation message, an error message, a message requesting user input, and/or the like), an error resulting from execution of the script, and/or the like. Content may include, for example, text, an amount of text (e.g., a word count, a character count), code, an amount of code (e.g., a number of lines of code, a number of characters in the code), an element (e.g., a code element, a hypertext markup language (HTML) element, an extensible markup language (XML) element, and/or the like), an attribute (e.g., a code attribute, an HTML attribute, an XML attribute), a type of element, a document object model (DOM) representation, a tag (e.g., a code tag, an HTML tag, an XML tag), combinations of the above content, and/or the like. In some implementations, the client device may compare a result of execution (e.g., content, a message, an error, and/or the like resulting from execution of the script) with an expected result (e.g., expected content, an expected message, and/or the like), which may be stored in memory of the client device.

As shown by reference number 130, the client device may transmit, and an analytics server may receive, a report associated with the script. The report may include information associated with the script, such as a script identifier, a script version, and/or other information associated with the script, as described above in connection with the validation request. The report may indicate whether the script was successfully executed by the client device (e.g., whether script execution succeeded or failed). In some implementations, if the script failed to execute successfully, the report may indicate a reason that the script failed to execute successfully, such as a result of script execution (e.g., resulting content that did not match expected content, an error resulting from execution, a message resulting from execution, and/or the like). In some implementations, the report may include information identifying the client device (e.g., a client device identifier, such as a network address, an Internet Protocol (IP) address, and/or the like). In example 100, the client device transmits, to the analytics server, a report indicating that execution of version 2.0 of Script A failed.

Although FIG. 1B shows the client device transmitting the report based on a determination that the script failed to execute, in some implementations, the client device may transmit the report based on a determination that the script executed successfully. In this case, the analytics server may use information about both successful script execution and unsuccessful script execution to determine whether to disable the script. Alternatively, the client device may transmit the report only if the script failed to execute, and may refrain from transmitting the report when the script executes successfully. In this case, network resources, resources of the client device, and resources of the analytics server may be conserved due to fewer transmissions and receptions of information.

As shown by reference number 135, the analytics server may determine whether a condition associated with execution of the script is satisfied. The determination may be based on the report. For example, the determination may be based on a script identifier, a script version, an indication of whether the script was successfully executed by the client device, and/or other information associated with the script, as described above. Additionally, or alternatively, the determination may be based on one or more indications, received from one or more other client devices, of whether the script was successfully executed by the one or more other client devices. For example, the analytics server may receive reports from multiple client devices, over time, as those client devices execute the script and transmit a report regarding the script.

In some implementations, the analytics server may determine that the condition is satisfied when the script has failed to successfully execute a threshold number of times (e.g., ever). For example, if the script fails 50 times (e.g., regardless of whether those failures occur on the same client device or on different client devices), the analytics server may disable the script. Additionally, or alternatively, the analytics server may determine that the condition is satisfied when the script has failed to successfully execute a threshold number of times in a time window (e.g., a time period). For example, if the script fails 5 times within a 24-hour period, the analytics server may disable the script. In this way, old failures, which may have been resolved, can be ignored.

Additionally, or alternatively, the analytics server may determine that the condition is satisfied when the script has failed to successfully execute a first threshold number of times for a second threshold number of client devices (e.g., ever, or within a time window). For example, if the script fails 7 times on 7 different client devices (e.g., identified using client device identifiers), the analytics server may disable the script. The first threshold and the second threshold may be the same threshold value or different threshold values. In this way, the analytics server may refrain from disabling the script when script errors are associated with a small number of client devices, which may have localized issues on the client devices rather than global issues that affect a large number of client devices.

Additionally, or alternatively, the analytics server may determine that the condition is satisfied when the script has failed to successfully execute a threshold number of times in a row (e.g., ever, or within a time window). For example, if the script fails 5 times in a row (e.g., 5 consecutive reports of failures, with no intervening reports indicated successful execution), then the analytics server may disable the script. Additionally, or alternatively, the analytics server may determine that the condition is satisfied when the script has failed to successfully execute a threshold number of times in a row for a threshold number of client devices. For example, if the script fails 5 times in a row for 5 unique client devices, then the analytics server may disable the script. In some implementations, the analytics server may treat multiple failures for the same client device (e.g., within a time window) as a single failure for that client device.

Additionally, or alternatively, the analytics server may determine that the condition is satisfied when the script has failed to successfully execute a threshold number of times for a set of (e.g., one or more) specified reasons (e.g., ever, or within a time window). For example, if the script fails 3 times with a specific error, then the analytics server may disable the script. In some implementations, the analytics server may store information that identifies the set of specified reasons, and may determine whether a received report indicates a reason included in the set of specified reasons. In this way, the analytics server can use a reason for script failure when determining whether to disable the script, which may be used to disable the script due to issues with the script (e.g., which may affect a relatively large number of client devices) rather than issues with the client device (e.g., which may affect a relatively small number of client devices).

In some implementations, the analytics server may use a combination of the above conditions to determine whether to disable the script. For example, the analytics server may determine whether the condition is satisfied based on one or more of a number of times that the script has failed to execute, a time window associated with script failures, a number of unique client devices that report script failures, whether failures are reported in consecutive reports or non-consecutive reports, one or more reported reasons for script failure, and/or the like. In some implementations, the analytics server may calculate a score using one or more of the above factors (e.g., a combination of factors, a weighted combination of factors, and/or the like), and may compare the score to a threshold to determine whether the condition is satisfied. In some implementations, one or more of the determinations described above in connection with scripts may be applied to a script having a specific script version, and the determination may be based on the script (e.g., identified using a script identifier) and a version of the script (e.g., identified using a version identifier). Furthermore, different thresholds described above may include the same threshold value or different threshold values.

As shown in FIG. 1B, the analytics server may store a log associated with one or more scripts. The log may store information received in a report and/or associated with a report. For example, the log may store information that identifies a script identified in a report, a version of the script, a client device from which the report was received, a time associated with the report (e.g., a time at which the script failed, a time at which the client device generated or transmitted the report, a time at which the report was received, and/or the like), an indication of whether execution of the script passed or failed (e.g., as indicated in the report), a reason for failure of the script, and/or the like. In example 100, the analytics server determines to disable the script because the script failed 3 times (e.g., at time T1, T3, and T4) on 3 different client devices (e.g., identified using IP addresses of IP A, IP B, and IP C).

As shown by reference number 140, the analytics server may selectively cause a data structure to be updated to indicate whether the script is to be disabled based on determining whether the condition is satisfied. For example, if the analytics server determines that the condition is satisfied, then the analytics server may cause the data structure to be updated to indicate that the script is disabled. However, if the analytics server determines that the condition is not satisfied, then the analytics server may refrain from causing the data structure to be updated.

As described above in connection with FIG. 1A, the data structure may be used to indicate, to client devices, whether the script is enabled prior to execution of the script by the client devices. In some implementations, the data structure may be stored by a validation server and may be used by the validation server as described above in connection with FIG. 1A. In this case, when the data structure is stored by a validation server separate from the analytics server, the analytics server may cause the data structure to be updated by transmitting an instruction, to the validation server, to update the data structure to indicate that the script is disabled, as shown in FIG. 1B. Alternatively, when the data structure is stored by the analytics server, the analytics server may cause the data structure to be updated by storing, in memory of the analytics server, an indication that the script is to be disabled (e.g., by changing a status indicator for the script and/or the version of the script).

Although FIG. 1B shows operations being performed by an analytics server to determine whether the condition is satisfied and to cause the script to be disabled based on a determination that the condition satisfied, in some implementations, one or more of these operations may be performed by the client device executing the script. For example, the script may include code to request a log, such as the log described herein, and to analyze information included in the log to determine whether the condition is satisfied, in a similar manner as described above. In this case, execution of the script may cause the client device to instruct the validation server to update the data structure to disable the script based on a determination that the condition is satisfied.

Furthermore, while FIG. 1B shows a determination of whether the condition is satisfied based on receiving a report after an attempted execution of the script, such a determination may be made at other times and/or triggered by other events. In some implementations, operations associated with making the determination may be performed upon receipt of each report from a client device. Additionally, or alternatively, operations associated with making the determination may be performed periodically (e.g., once per 30 minutes, once per hour, once per every 6 hours, once per day, and/or the like). Additionally, or alternatively, operations associated with making the determination may be performed based on receiving a validation request (e.g., based on communication between the analytics server and the validation server).

Figure 1C:
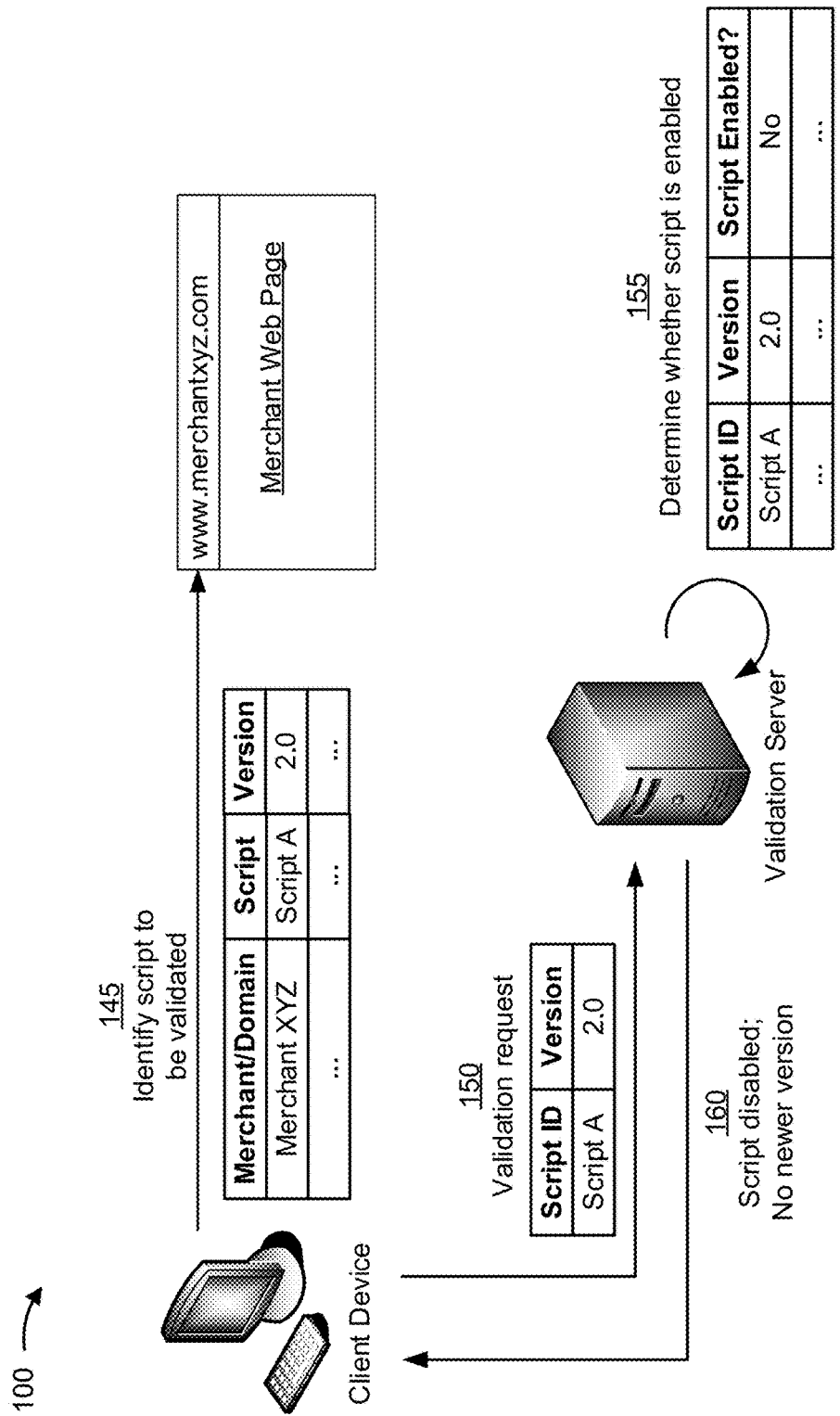

As shown in FIG. 1C, and by reference number 145, at a later time, the client device may identify a script to be validated, in a similar manner as described above in connection with FIG. 1A. For example, after the operations described above in connection with FIGS. 1A and 1B have been performed, the client device may detect navigation to a web page, shown as "merchantxyz.com." The client device may identify that Script A, for which version 2.0 is installed on the client device, is associated with the web page. For example, the client device may have previously received and/or installed version 2.0 of Script A, as described above. Prior to executing the script in connection with detecting navigation to the web page, the client device may request validation of the script.

As shown by reference number 150, the client device may transmit, to the validation server, a validation request for the script, in a similar manner as described above in connection with FIG. 1A. The validation request includes a script identifier (e.g., shown as "Script A") and a version identifier (e.g., shown as version 2.0) of the identified script.

As shown by reference number 155, the validation server may determine whether the script is enabled, in a similar manner as described above in connection with FIG. 1A. As shown, the data structure stores information indicating that version 2.0 of Script A is disabled due to the instruction received from the analytics server, as described above in connection with FIG. 1B. Because the stored status indicator for version 2.0 of Script A indicates that version 2.0 of Script A is disabled, the validation server determines that version 2.0 of Script A is disabled.

As shown by reference number 160, based on the determination, the validation server may transmit, and the client device may receive, an indication that the script is disabled. In this case, version 2.0 of Script A is the most updated version, so the validation server may not indicate a newer version of the script or a location from which a newer version of the script can be obtained. In this case, the client device may refrain from executing the script, may refrain from presenting a request for user input regarding whether to execute the script, and/or the like. In this way, execution of an error-prone script may be avoided. In some implementations, the client device may output a message based on receiving the indication that the script is disabled. For example, the client device may output a message indicating that the script is disabled. Additionally, or alternatively, the message may include a request for user input regarding the script, such as an indication of whether the user would use the script, whether the script would be useful, and/or the like. In some implementations, a user response to the request may be used to determine whether to repair the script.

Figure 1D:
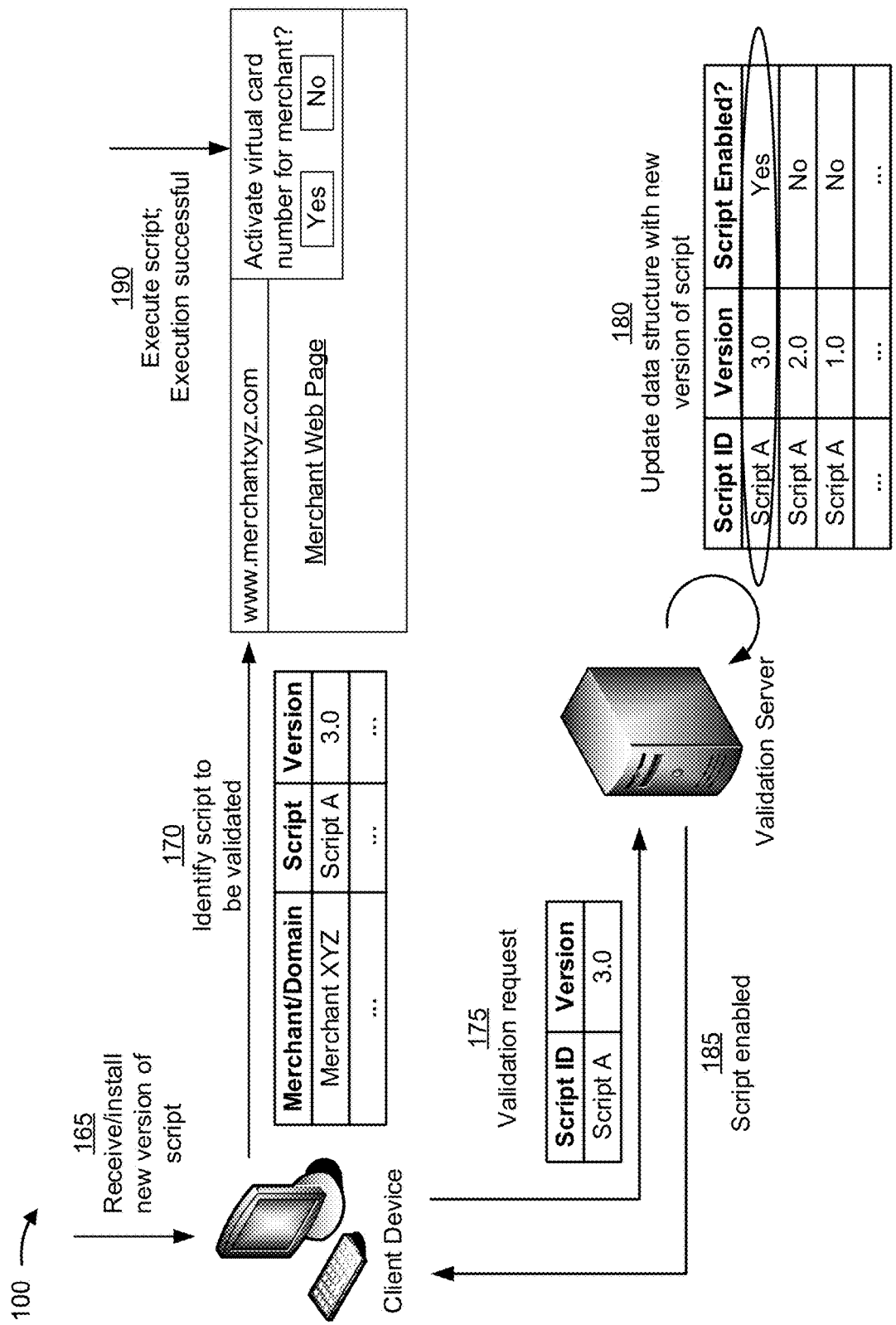

As shown in FIG. 1D, and by reference number 165, at a later time, the client device may receive and/or install a new version of the script. For example, an application and/or browser extension may be updated to include a new version of the script (e.g., automatically, after receiving user authorization, and/or the like). The client device may receive and/or install the new version of the script after the operations described above in connection with FIGS. 1A-1C have been performed.

As shown by reference number 170, the client device may identify a script to be validated, in a similar manner as described above. As shown, the client device may identify Script A, for which version 3.0 (e.g., the new version) is installed on the client device. Prior to executing the version 3.0 of Script A in connection with detecting navigation to the web page, the client device may request validation of the script.

As shown by reference number 175, the client device may transmit, to the validation server, a validation request for the script, in a similar manner as described above. The validation request includes a script identifier (e.g., shown as "Script A") and a version identifier (e.g., shown as version 3.0) of the identified script.

As shown by reference number 180, the validation server may update the data structure to indicate that a new version of the script is enabled. In some implementations, the data structure may not store information regarding the new version of the script when the validation request is received. In this case, the validation server may determine that an indication of whether the new version of the script is enabled or disabled is not already stored in the data structure. Additionally, or alternatively, the validation server may determine that the version of the script is a newer version than any version stored in the data structure. Based on one or more of these determinations, the validation server may update the data structure to store an indication that the new version of the script is enabled. Additionally, or alternatively, the data structure may update the data structure to indicate that one or more old versions of the script (e.g., version 2.0, version 1.0, and/or the like) are disabled.

In some implementations, rather than updating the data structure based on a validation request that identifies a new version of a script, the validation server may update the data structure based on a different indication. For example, the validation server may receive, from a device associated with a creator of the script (e.g., a deployment device), an instruction to add a new version of a script to the data structure and to store a status indicator indicating that the new version of the script is enabled.

As shown by reference number 185, based on determining that the new version of the script is enabled, the validation server may transmit, and the client device may receive, an indication that the script is enabled. In some implementations, the client device may execute the script based on receiving the indication that the script is enabled.

Additionally, or alternatively, as shown by reference number 190, based on receiving the indication that the script is enabled, the client device may present, for display by the client device (e.g., by a web browser, an application, and/or the like), a request for user input indicating whether to execute the script. For example, the request may include a notification output for display and indicating that a script is available to execute. The notification may include information regarding an action to be performed by execution of the script, shown as activating a virtual card number for a merchant associated with the web page. The client device may receive user input (e.g., via interaction with an input element included in the notification), and may execute the script (or refrain from executing the script based on the user input).

By validating a script before executing the script and/or prompting a user regarding whether to execute the script, failed execution of a script may be avoided, or the likelihood of failed execution of a script may be reduced. In this way, resources of the client device (e.g., memory resources, processing resources, battery power, and/or the like) may be conserved by refraining from executing a script when such execution would result in an error, by refraining from attempting to execute a script multiple times, and/or the like. Furthermore, when the script uses network resources (e.g., to transmit information to another device and/or to receive information from another device) and/or interacts with a server device, those network resources and/or resources of the server device (e.g., memory resources, processing resources, and/or the like) may be conserved by refraining from executing a script when such execution would result in an error, by refraining from attempting to execute a script multiple times, and/or the like.

As indicated above, FIGS. 1A-1D are provided as an example. Other examples may differ from what was described with regard to FIGS. 1A-1D.

Figure 2:
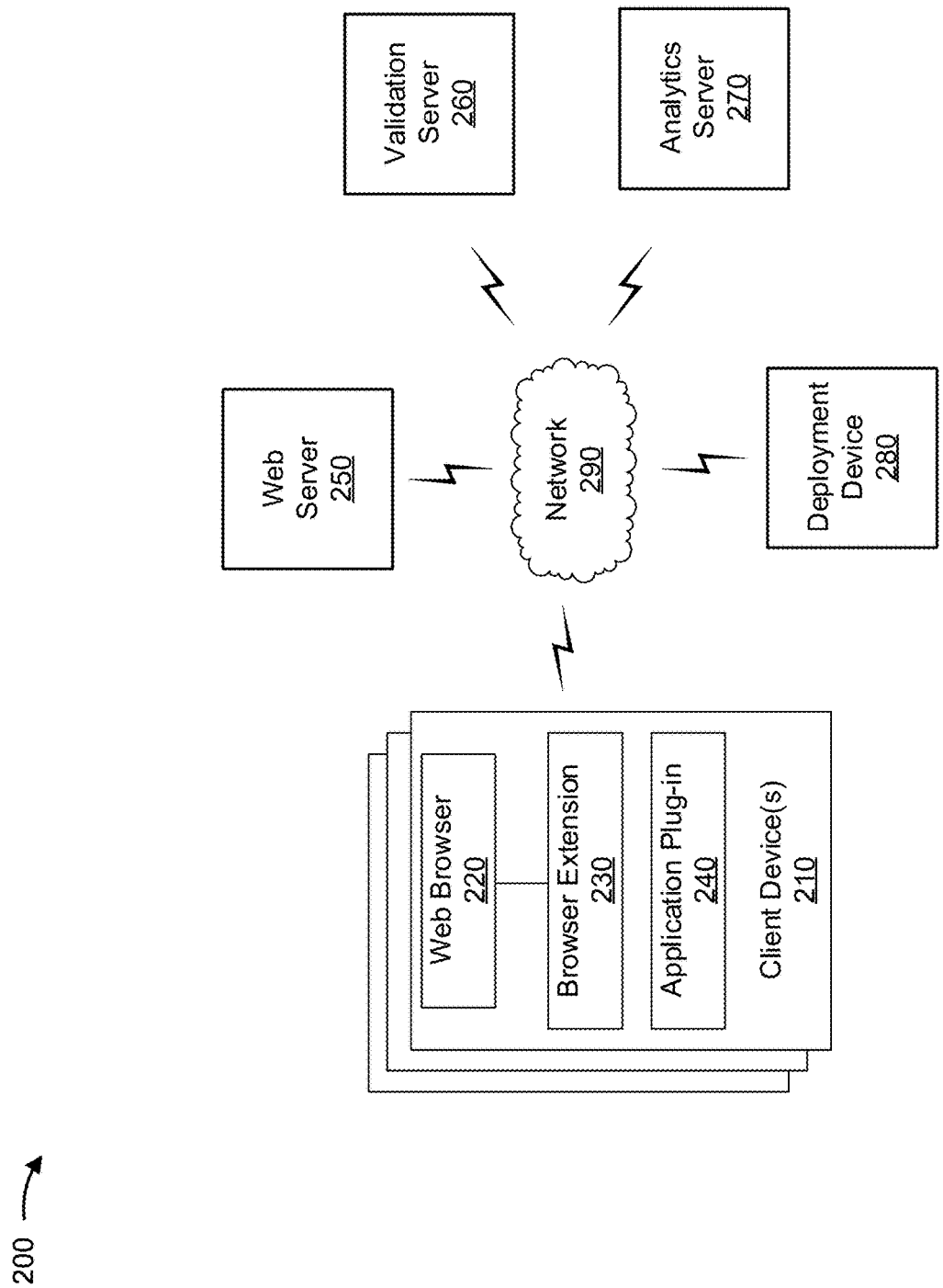
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more client devices 210 (e.g., which may execute a web browser 220, a browser extension 230, and/or an application plug-in 240), a web server 250, a validation server 260, an analytics server 270, a deployment device 280, and a network 290. Devices of environment 200 may interconnect via wired connections, wireless connections, or a combination of wired and wireless connections.

Client device 210 includes a device that supports web browsing and/or network access via an application. For example, client device 210 may include a computer (e.g., a desktop computer, a laptop computer, a tablet computer, a handheld computer, and/or the like), a mobile phone (e.g., a smart phone and/or the like), a television (e.g., a smart television), an interactive display screen, and/or a similar type of device. Client device 210 may host a web browser 220 and/or a browser extension 230 installed on and/or executing on the client device 210. Additionally, or alternatively, client device 210 may host one or more applications 240 that permit access to a network (e.g., the Internet).

Web browser 220 includes an application, executing on client device 210, that supports web browsing. For example, web browser 220 may be used to access information on the World Wide Web, such as web pages, images, videos, and/or other web resources. Web browser 220 may access such web resources using a uniform resource identifier (URI), such as a uniform resource locator (URL), a uniform resource name (URN), and/or the like. Web browser 220 may enable client device 210 to retrieve and present, for display, content of a web page.

Browser extension 230 includes an application, executing on client device 210, capable of extending or enhancing functionality of web browser 220. For example, browser extension 230 may be a plug-in application for web browser 220. Browser extension 230 may be capable of executing one or more scripts (e.g., code, which may be written in a scripting language, such as JavaScript and/or the like) to perform an operation in association with the web browser 220.

Application plug-in 240 includes an application plug-in, executing on client device 210, capable of extending or enhancing functionality of an application. Browser extension 230 is an example of an application plug-in 240 (e.g., where the enhanced application is a web browser 220), but other examples are possible. Application plug-in 240 may be capable of executing one or more scripts (e.g., code, which may be written in a scripting language, such as JavaScript and/or the like) to perform an operation in association with an application.

Web server 250 includes a device capable of serving web content (e.g., web documents, HTML documents, web resources, images, style sheets, scripts, text, and/or the like). For example, web server 250 may include a server and/or computing resources of a server, which may be included in a data center, a cloud computing environment, and/or the like. Web server 250 may process incoming network requests (e.g., from client device 210) using HTTP and/or another protocol. Web server 250 may store, process, and/or deliver web pages to client device 210. In some implementations, communication between web server 250 and client device 210 may take place using HTTP.

Validation server 260 includes a device capable of communicating with client device 210 to support validation of scripts. For example, validation server 260 may store and/or process information for use by browser extension 230 and/or application plug-in 240. As an example, validation server 260 may store a data structure used to indicate, to client device(s) 210, whether a script is enabled (e.g., prior to execution of the script by the client device(s) 210), as described above. In some implementations, validation server 260 may interact with analytics server 270, such as to receive instructions to enable or disable one or more scripts.

Analytics server 270 includes a device capable of communicating with client device 210 and/or validation server 260 to support disabling of error-prone scripts. For example, analytics server 270 may store and/or process information for use by browser extension 230 and/or application plug-in 240. As an example, analytics server 270 may store a log used to determine whether to enable or disable a script, as described above. In some implementations, analytics server 270 and validation server 260 may be implemented as a single server.

Deployment device 280 includes a device capable of deploying a new script and/or a new version of a script (e.g., based on new code being created for the script). Deployment device 280 may deploy a script by transmitting the script to a client device 210 for installation, by instructing validation server 260 to update a data structure to store a status indicator for the script (e.g., indicating that the script is enabled), by instructing analytics server 270 to begin collecting data in a log associated with the script, and/or the like.

Network 290 includes one or more wired and/or wireless networks. For example, network 290 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
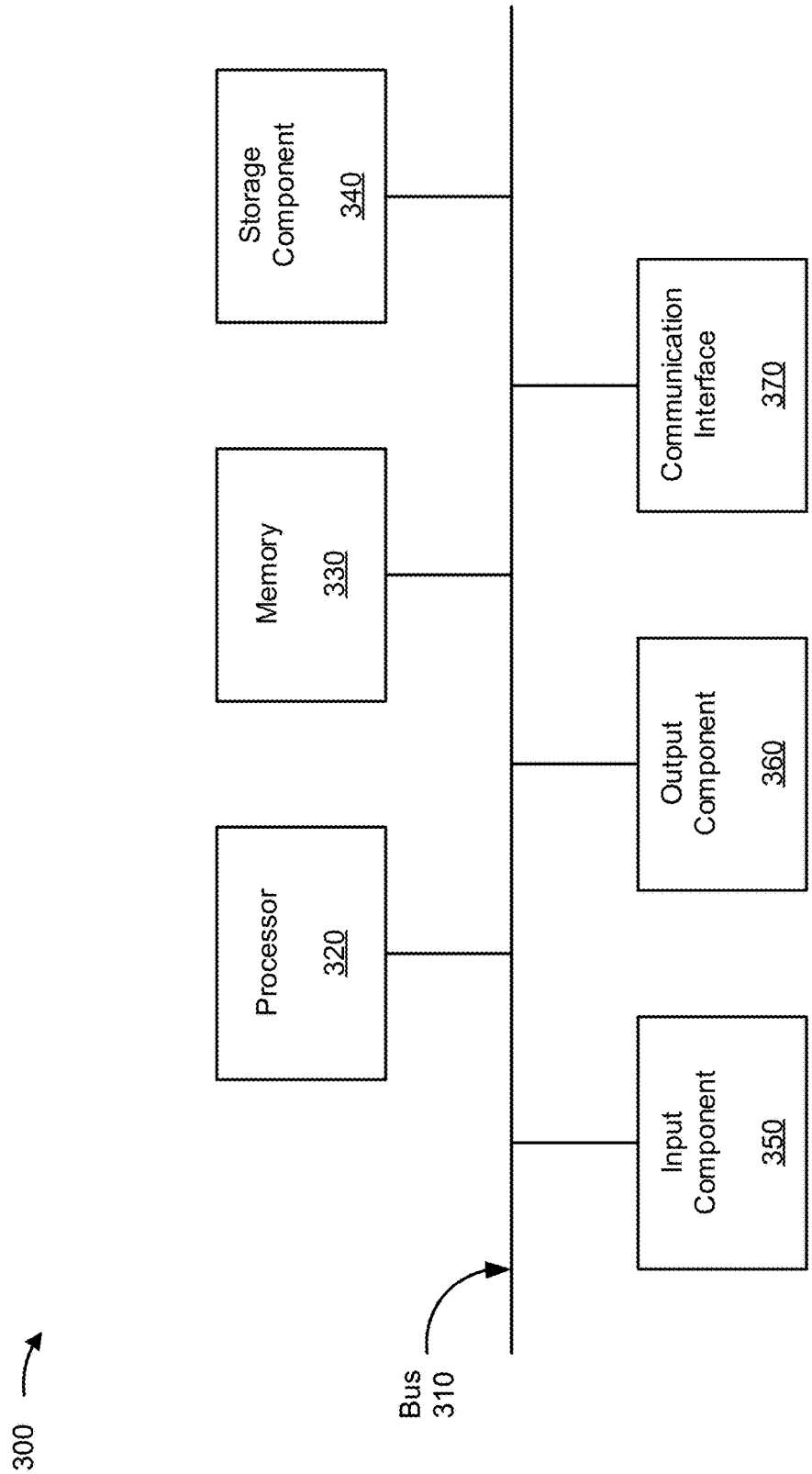
FIG. 3 is a diagram of example components of one or more devices of FIG. 2.

FIG. 3 is a diagram of example components of a device 300. Device 300 may correspond to client device 210, web server 250, validation server 260, analytics server 270, deployment device 280, and/or the like. In some implementations, client device 210, web server 250, validation server 260, analytics server 270, and/or deployment device 280 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
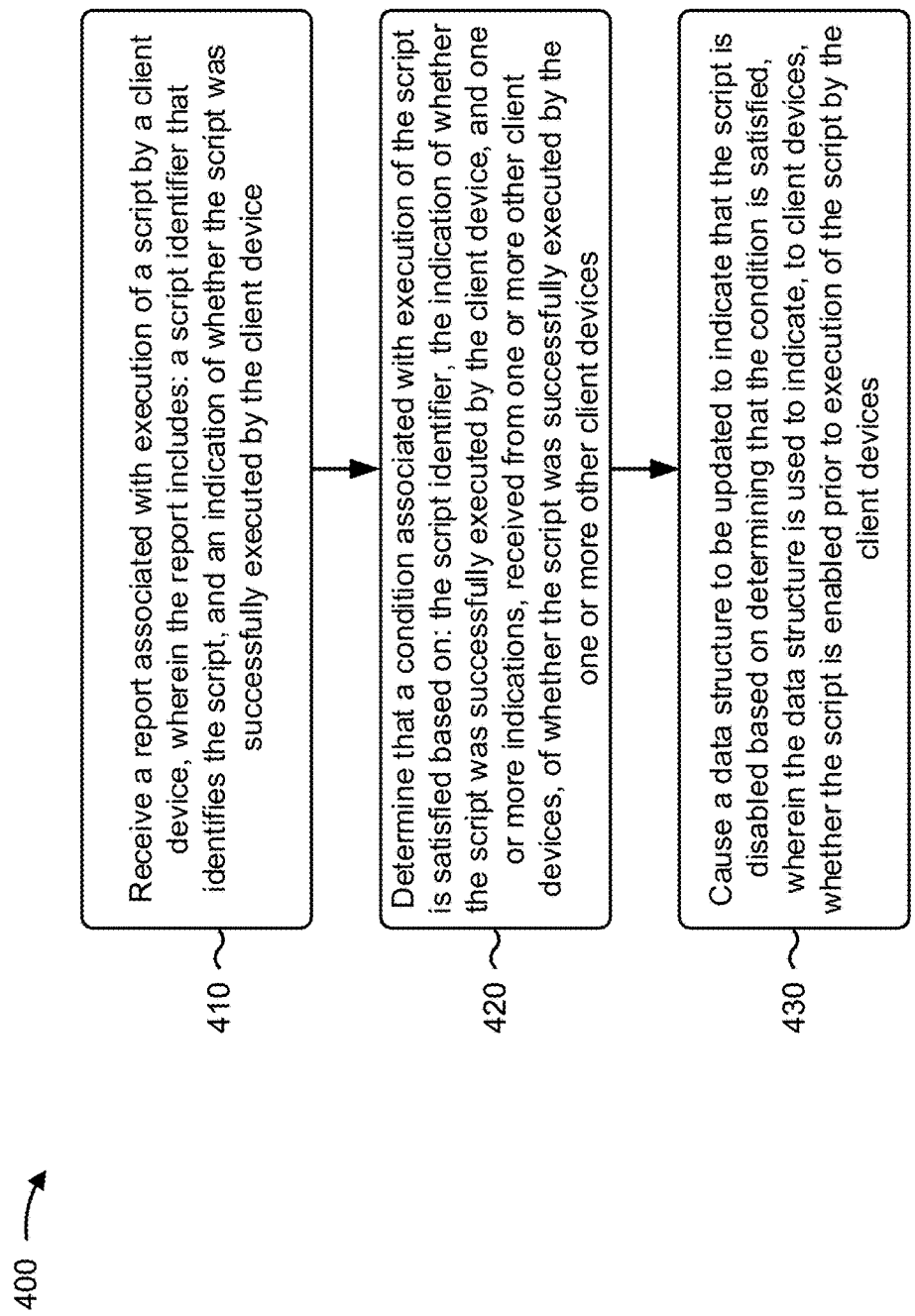
FIGS. 4-6 are flow charts of example processes associated with disabling a script based on indications of unsuccessful execution of the script.

FIG. 4 is a flow chart of an example process 400 for disabling a script based on indications of unsuccessful execution of the script. In some implementations, one or more process blocks of FIG. 4 may be performed by an analytics server (e.g. analytics server 270). In some implementations, one or more process blocks of FIG. 4 may be performed by another device or a group of devices separate from or including the analytics server, such as a client device (e.g., client device 210, which may execute web browser 220, browser extension 230, and/or application plug-in 240), a web server (e.g., web server 250), a validation server (e.g., validation server 260), a deployment device (e.g., deployment device 280), and/or the like.

As shown in FIG. 4, process 400 may include receiving a report associated with execution of a script by a client device, wherein the report includes: a script identifier that identifies the script, and an indication of whether the script was successfully executed by the client device (block 410). For example, the analytics server (e.g., using processor 320, memory 330, storage component 340, input component 350, output component 360, communication interface 370, and/or the like) may receive a report associated with execution of a script by a client device, as described above. In some implementations, the report includes a script identifier that identifies the script, an indication of whether the script was successfully executed by the client device, and/or the like.

As further shown in FIG. 4, process 400 may include determining that a condition associated with execution of the script is satisfied based on: the script identifier, the indication of whether the script was successfully executed by the client device, and one or more indications, received from one or more other client devices, of whether the script was successfully executed by the one or more other client devices (block 420). For example, the analytics server (e.g., using processor 320, memory 330, storage component 340, input component 350, output component 360, communication interface 370, and/or the like) may determine that a condition associated with execution of the script, as described above. In some implementations, the determination may be based on the script identifier, the indication of whether the script was successfully executed by the client device, one or more indications, received from one or more other client devices, of whether the script was successfully executed by the one or more other client devices, and/or the like.

As shown in FIG. 4, process 400 may include causing a data structure to be updated to indicate that the script is disabled based on determining that the condition is satisfied, wherein the data structure is used to indicate, to client devices, whether the script is enabled prior to execution of the script by the client devices (block 430). For example, the analytics server (e.g., using processor 320, memory 330, storage component 340, input component 350, output component 360, communication interface 370, and/or the like) may cause a data structure to be updated to indicate that the script is disabled based on determining that the condition is satisfied, as described above. In some implementations, the data structure is used to indicate, to client devices, whether the script is enabled prior to execution of the script by the client devices.

Process 400 may include additional aspects, such as any single aspect or any combination of aspects described below and/or in connection with one or more other processes described elsewhere herein.

In some implementations, determining that the condition associated with execution of the script is satisfied includes at least one of: determining that the script has failed to successfully execute a threshold number of times, determining that the script has failed to successfully execute a threshold number of times in a time window, determining that the script has failed to successfully execute a first threshold number of times for a second threshold number of client devices, determining that the script has failed to successfully execute a threshold number of times in a row, determining that the script has failed to successfully execute a threshold number of times for a set of specified reasons, or a combination thereof. In some implementations, the report indicates a reason that the script did not successfully execute, and determining that the condition associated with execution of the script is satisfied is based on the reason.

In some implementations, the report indicates a version of the script, determining that the condition associated with execution of the script is satisfied is based on the version of the script, and the data structure is updated to indicate that the version of the script is disabled. In some implementations, the data structure is updated to indicate that a new version of the script is enabled. In some implementations, the data structure is updated based on a request, from the client device, to validate the new version of the script, and based on a determination that an indication of whether the new version is enabled is not already stored in the data structure. In some implementations, one or more old versions of the script are disabled based on updating the data structure to indicate that the new version of the script is enabled.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
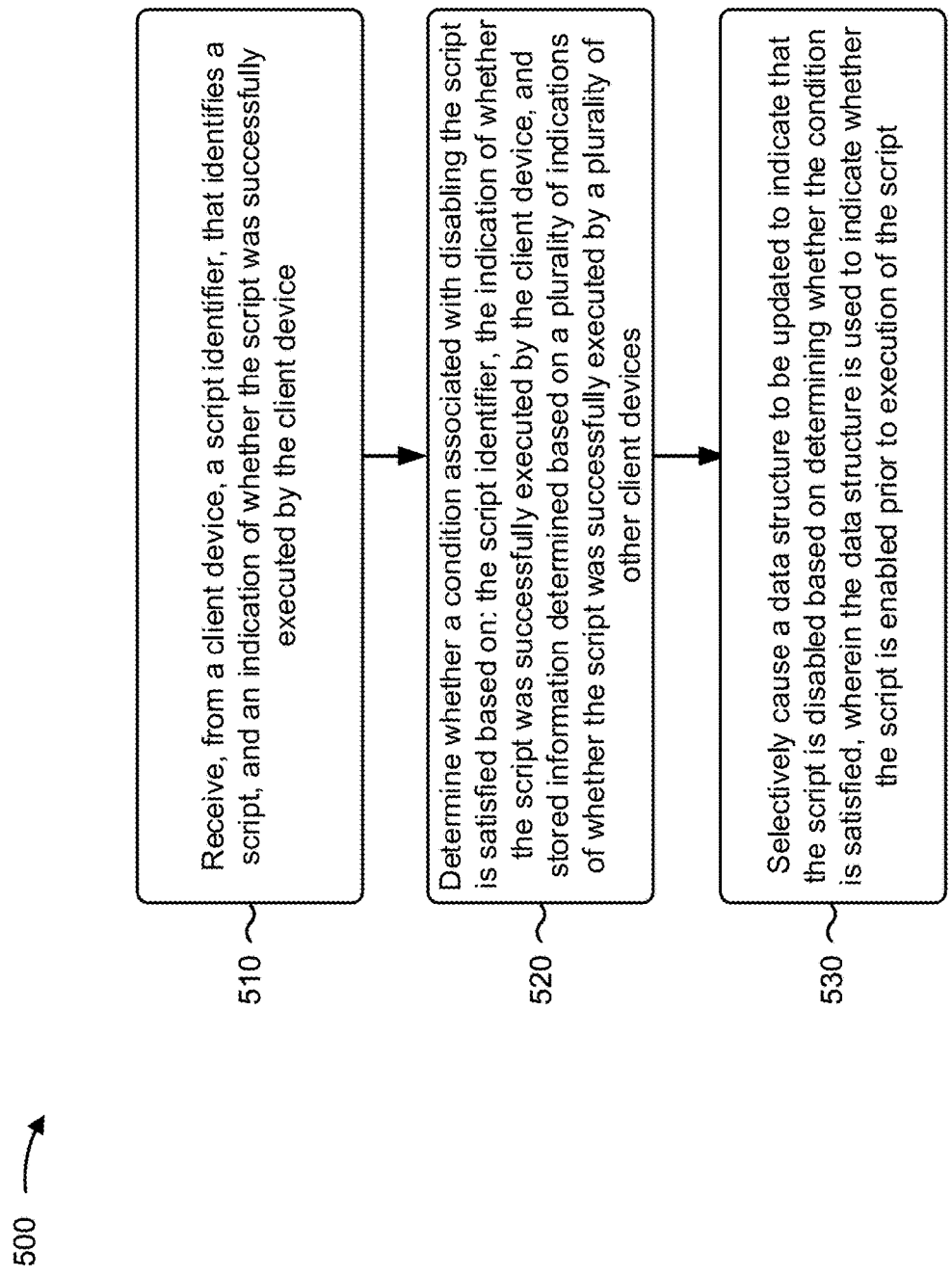

FIG. 5 is a flow chart of an example process 500 for disabling a script based on indications of unsuccessful execution of the script. In some implementations, one or more process blocks of FIG. 5 may be performed by an analytics server (e.g. analytics server 270). In some implementations, one or more process blocks of FIG. 5 may be performed by another device or a group of devices separate from or including the analytics server, such as a client device (e.g., client device 210, which may execute web browser 220, browser extension 230, and/or application plug-in 240), a web server (e.g., web server 250), a validation server (e.g., validation server 260), a deployment device (e.g., deployment device 280), and/or the like.

As shown in FIG. 5, process 500 may include receiving, from a client device, a script identifier, that identifies a script, and an indication of whether the script was successfully executed by the client device (block 510). For example, the analytics server (e.g., using processor 320, memory 330, storage component 340, input component 350, output component 360, communication interface 370, and/or the like) may receive, from a client device, a script identifier, that identifies a script, and an indication of whether the script was successfully executed by the client device, as described above.

As further shown in FIG. 5, process 500 may include determining whether a condition associated with disabling the script is satisfied based on: the script identifier, the indication of whether the script was successfully executed by the client device, and stored information determined based on a plurality of indications of whether the script was successfully executed by a plurality of other client devices (block 520). For example, the analytics server (e.g., using processor 320, memory 330, storage component 340, input component 350, output component 360, communication interface 370, and/or the like) may determine whether a condition associated with disabling the script is satisfied, as described above. In some implementations, the determination is based on the script identifier, the indication of whether the script was successfully executed by the client device, and stored information determined based on a plurality of indications of whether the script was successfully executed by a plurality of other client devices.

As further shown in FIG. 5, process 500 may include selectively causing a data structure to be updated to indicate that the script is disabled based on determining whether the condition is satisfied, wherein the data structure is used to indicate whether the script is enabled prior to execution of the script (block 530). For example, the analytics server (e.g., using processor 320, memory 330, storage component 340, input component 350, output component 360, communication interface 370, and/or the like) may selectively cause a data structure to be updated to indicate that the script is disabled based on determining whether the condition is satisfied, as described above. In some implementations, the data structure is used to indicate whether the script is enabled prior to execution of the script.

Process 500 may include additional aspects, such as any single aspect or any combination of aspects described below and/or in connection with one or more other processes described elsewhere herein.

In some implementations, the data structure is stored in the memory of the server device, and selectively causing the data structure to be updated includes storing an indication that the script is disabled based on a determination that the condition associated with disabling the script is satisfied. In some implementations, the data structure is stored by a device other than the server device, and selectively causing the data structure to be updated includes transmitting an instruction, to the device, to update the data structure to indicate that the script is disabled based on a determination that the condition associated with disabling the script is satisfied. In some implementations, determining whether the condition is satisfied includes determining whether the script has failed to successfully execute a first threshold number of times for a second threshold number of unique client devices.

In some implementations, process 500 includes receiving, from the client device, a version identifier that identifies a version of the script. In some implementations, determining whether the condition is satisfied includes: determining that the version of the script has failed to successfully execute a threshold number of times across a plurality of client devices, determining that the version of the script has failed to successfully execute a threshold number of times across a plurality of client devices during a time period, determining that the version of the script has failed to successfully execute a first threshold number of times for a second threshold number of client devices, determining that the version of the script has failed to successfully execute a threshold number of times in a row across a plurality of client devices, determining that the version of the script has failed to successfully execute a threshold number of times for one or more specific reasons across a plurality of client devices, or a combination thereof. In some implementations, when selectively causing the data structure to be updated includes selectively causing the data structure to be updated to indicate that the version of the script is disabled.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
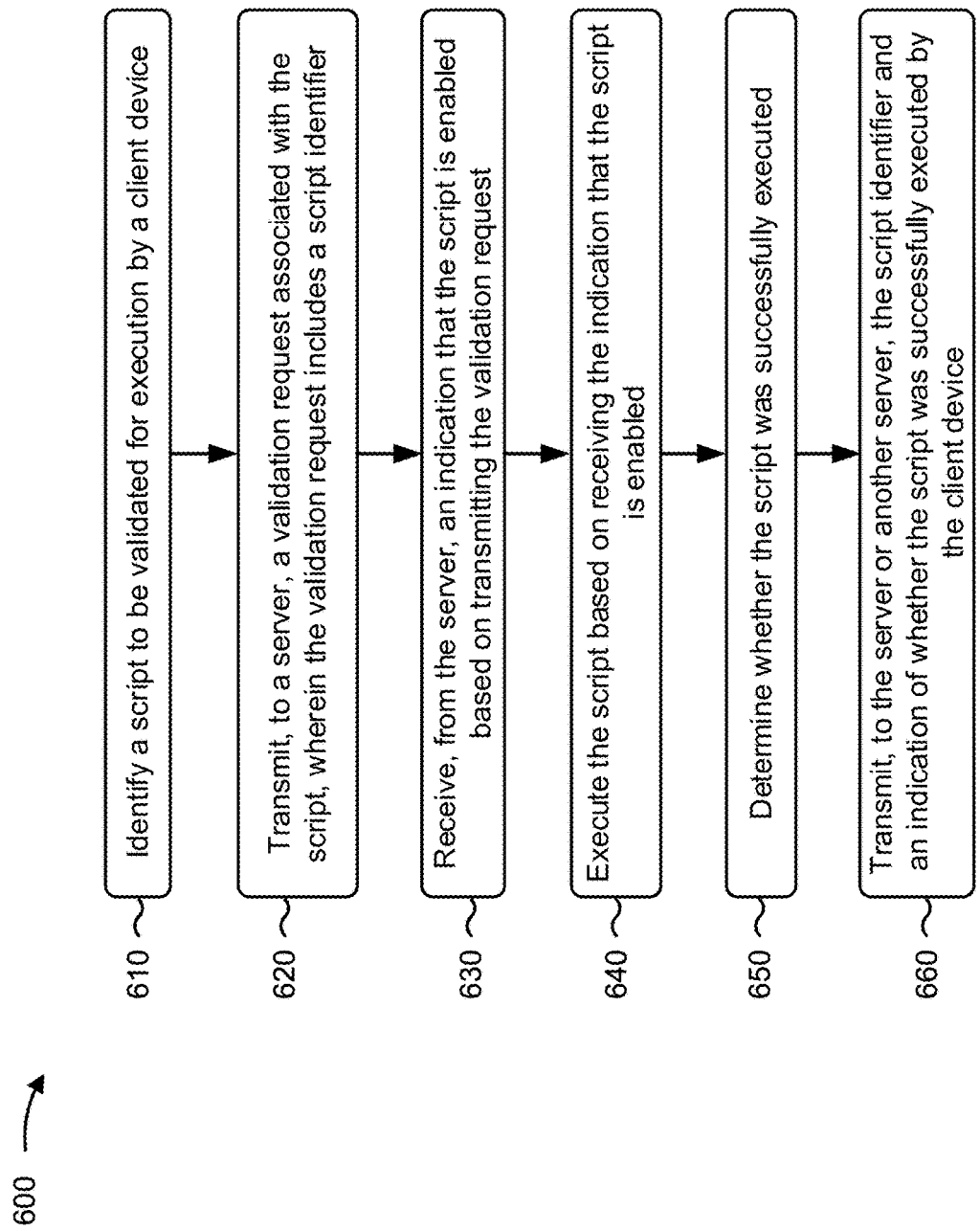

FIG. 6 is a flow chart of an example process 600 for disabling a script based on indications of unsuccessful execution of the script. In some implementations, one or more process blocks of FIG. 6 may be performed by a client device (e.g., client device 210, which may execute web browser 220, browser extension 230, and/or application plug-in 240 to perform one or more process blocks of FIG. 6). In some implementations, one or more process blocks of FIG. 6 may be performed by another device or a group of devices separate from or including the client device, such as a web server (e.g., web server 250), a validation server (e.g., validation server 260), an analytics server (e.g., analytics server 270), a deployment device (e.g., deployment device 280), and/or the like.

As shown in FIG. 6, process 600 may include identifying a script to be validated for execution by the client device (block 610). For example, the client device (e.g., using processor 320, memory 330, storage component 340, input component 350, output component 360, communication interface 370, and/or the like) may identify a script to be validated for execution by the client device, as described above.

As further shown in FIG. 6, process 600 may include transmitting, to a server, a validation request associated with the script, wherein the validation request includes a script identifier (block 620). For example, the client device (e.g., using processor 320, memory 330, storage component 340, input component 350, output component 360, communication interface 370, and/or the like) may transmit, to a server, a validation request associated with the script, as described above. In some implementations, the validation request includes a script identifier.

As shown in FIG. 6, process 600 may include receiving, from the server, an indication that the script is enabled based on transmitting the validation request (block 630). For example, the client device (e.g., using processor 320, memory 330, storage component 340, input component 350, output component 360, communication interface 370, and/or the like) may receive, from the server, an indication that the script is enabled based on transmitting the validation request, as described above.

As shown in FIG. 6, process 600 may include executing the script based on receiving the indication that the script is enabled (block 640). For example, the client device (e.g., using processor 320, memory 330, storage component 340, input component 350, output component 360, communication interface 370, and/or the like) may execute the script based on receiving the indication that the script is enabled, as described above.

As shown in FIG. 6, process 600 may include determining whether the script was successfully executed (block 650). For example, the client device (e.g., using processor 320, memory 330, storage component 340, input component 350, output component 360, communication interface 370, and/or the like) may determine whether the script was successfully executed, as described above.

As shown in FIG. 6, process 600 may include transmitting, to the server or another server, the script identifier and an indication of whether the script was successfully executed by the client device (block 660). For example, the client device (e.g., using processor 320, memory 330, storage component 340, input component 350, output component 360, communication interface 370, and/or the like) may transmit, to the server or another server, the script identifier and an indication of whether the script was successfully executed by the client device, as described above.

Process 600 may include additional aspects, such as any single aspect or any combination of aspects described below and/or in connection with one or more other processes described elsewhere herein.

In some implementations, process 600 may include presenting, for display by the client device, a request for user input indicating whether to execute the script based on receiving the indication that the script is enabled, receiving the user input, and executing the script based on receiving the user input. In some implementations, the script is one of a plurality of scripts to be validated, validation requests for the plurality of scripts are transmitted to the server, and an indication of a set of enabled scripts, of the plurality of scripts, is received from the server. In some implementations, process 600 may include presenting information that identifies the set of enabled scripts and executing one or more scripts, of the set of enabled scripts, indicated by user input.

In some implementations, the validation request indicates a first version of the script. In some implementations, process 600 may include receiving, from the server, an indication that the first version of the script is disabled based on transmitting the validation request, and receiving a second version of the script. In some implementations, the second version of the script is implicitly enabled. In some implementations, process 600 may include executing the second version of the script.

In some implementations, identifying the script to be validated includes identifying the script to be validated based on detecting navigation to a domain included in a list of domains associated with execution of one or more scripts that include the script. In some implementations, transmitting the indication of whether the script was successfully executed includes transmitting an indication that the script failed to successfully execute and transmitting an indication of a reason that the script failed to successfully execute. In some implementations, process 600 may include transmitting the script identifier and the indication of whether the script was successfully executed based on a determination that the script was not successfully executed, and refraining from transmitting the script identifier and the indication of whether the script was successfully executed based on a determination that the script was successfully executed.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    providing, by a first device, information associated with a list of domains associated with execution of one or more scripts,
        wherein a script, associated with the one or more scripts, is identified based on detecting navigation to a domain included in the list;
    receiving, by the first device, from a second device, information that a script was not successfully executed by the second device;
    determining, by the first device, that the script failed to successfully execute a threshold number of times by the second device;
    disabling, by the first device and based on determining that the script was not successfully executed, use of the script by one or more third devices,
        wherein the disabling comprises:
            causing a data structure, that is used to indicate to the one or more third devices whether the script is enabled or disabled, to be updated to indicate that the script is disabled;
    receiving, by the first device and from a third device of the one or more third devices, a validation request associated with the script;
    transmitting, by the first device and based on the validation request, an indication associated with the data structure indicating that the script is disabled,
        wherein the indication causes the third device to refrain from executing the script; and
    transmitting, by the first device, to the third device, based on the data structure being updated to indicate that the script is disabled and based on determining whether an updated script is available, the updated script.

2. The method of claim 1, wherein the information indicates a reason that the script was not successfully executed, and
    wherein determining that the script was not successfully executed by the first device is further based on the reason.

3. The method of claim 1, wherein one or more old versions of the script are disabled based on updating the data structure to indicate that the updated script is enabled.

4. The method of claim 1, further comprising:
    transmitting a message that includes a request for input for information regarding at least one of:
        whether the script would be used, or
        whether the script would be useful; and
    determining, based on a response to the message, whether to repair the script.

5. The method of claim 1, wherein the script is identified based on detecting navigation to a domain included in a list of domains associated with execution of one or more scripts that include the script.

6. The method of claim 1, further comprising:
    receiving a request to validate a different version of the script; and
    updating, based on validating the different version of the script, the data structure to indicate that the different version of the script is enabled.

7. The method of claim 6, further comprising:
    disabling, based on updating the data structure to indicate that the different version of the script is enabled, one or more older versions of the script.

8. A first device, comprising:
    one or more memories; and
    one or more processors, coupled to the one or more memories, configured to:
        provide information associated with a list of domains associated with execution of one or more scripts,
            wherein a script, associated with the one or more scripts, is identified based on detecting navigation to a domain included in the list;
        receive, from a second device, information that the script was not successfully executed by the second device;
        determine that the script did not successfully execute a threshold number of times by the second device;
        disable, based on determining that the script was not successfully executed, use of the script by one or more third devices, wherein the disabling comprises:
    causing a data structure, that is used to indicate whether the script is enabled or disabled, to be updated to indicate that the script is disabled;
    transmit, to a third device of the one or more third devices, an indication associated with the data structure indicating that the script is disabled,
        wherein the indication causes the third device to refrain from executing the script; and
    transmit, to the third device, based on the data structure being updated to indicate that the script is disabled and based on determining whether an updated script is available, the updated script.

9. The first device of claim 8, wherein the information indicates a reason that the script was not successfully executed, and
    wherein determining that the script was not successfully executed by the first device is further based on the reason.

10. The first device of claim 8, wherein one or more old versions of the script are disabled based on updating the data structure to indicate that the updated script is enabled.

11. The first device of claim 8, wherein the one or more processors are further configured to:
    transmit a message that includes a request for input for information regarding at least one of:
        whether the script would be used, or
        whether the script would be useful; and
    determine, based on a response to the message, whether to repair the script.

12. The first device of claim 8, wherein the script is identified based on detecting navigation to a domain included in a list of domains associated with execution of one or more scripts that include the script.

13. The first device of claim 8, wherein the one or more processors are further configured to:
    receive a request to validate a different version of the script; and
    update, based on validating the different version of the script, the data structure to indicate that the different version of the script is enabled.

14. The first device of claim 13, wherein the one or more processors are further configured to:
    disable, based on updating the data structure to indicate that the different version of the script is enabled, one or more older versions of the script.

15. A non-transitory computer-readable medium storing a set of instructions, the set of instructions comprising:
    one or more instructions that, when executed by one or more processors of a first device, cause the first device to:
        provide information associated with a list of domains associated with execution of one or more scripts,
            wherein a script, associated with the one or more scripts, is identified based on detecting navigation to a domain included in the list;
        receive, from a second device, information that the script was not successfully executed by the second device;
        determine that the script did not successfully execute a threshold number of times by the second device;
        disable, based on determining that the script was not successfully executed, use of the script by one or more third devices,
            wherein the disabling comprises:
                cause an indication, that indicates whether the script is enabled or disabled, to be updated to indicate that the script is disabled;
            transmit, to a third device of the one or more third devices, the indication that the script is disabled,
                wherein the indication causes the third device to refrain from executing the script; and
            transmit to the third device, based on the indication being updated to indicate that the script is disabled and based on determining whether an updated script is available, the updated script.

16. The non-transitory computer-readable medium of claim 15, wherein the information indicates a reason that the script was not successfully executed, and
    wherein determining that the script was not successfully executed by the first device is further based on the reason.

17. The non-transitory computer-readable medium of claim 15, wherein one or more old versions of the script are disabled based on updating the indication to indicate that the updated script is enabled.

18. The non-transitory computer-readable medium of claim 15, wherein the one or more instructions further cause the first device to:
    transmit a message that includes a request for input for information regarding at least one of:
        whether the script would be used, or
        whether the script would be useful; and
    determine, based on a response to the message, whether to repair the script.

19. The non-transitory computer-readable medium of claim 15, wherein the script is identified based on detecting navigation to a domain included in a list of domains associated with execution of one or more scripts that include the script.

20. The non-transitory computer-readable medium of claim 15, wherein the one or more instructions further cause the first device to:
    receive a request to validate a different version of the script; and
    update, based on validating the different version of the script, a data structure to indicate that the different version of the script is enabled.

21. The non-transitory computer-readable medium of claim 20, wherein the one or more instructions further cause the first device to:
    disable, based on updating the data structure to indicate that the different version of the script is enabled, one or more older versions of the script.

* * * * *